United States Patent
Sethi (10) Patent No.: US 7,716,395 B2
(45) Date of Patent: May 11, 2010

(54) LOW LATENCY MECHANISM FOR DATA TRANSFERS BETWEEN A MEDIA CONTROLLER AND A COMMUNICATION DEVICE

(75) Inventor: Prashant Sethi, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 172 days.

(21) Appl. No.: 11/648,298

(22) Filed: Dec. 29, 2006

(65) Prior Publication Data

US 2008/0162750 A1    Jul. 3, 2008

(51) Int. Cl.
*G06F 5/00* (2006.01)
*G06F 3/00* (2006.01)

(52) U.S. Cl. ............................................. 710/52; 710/6
(58) Field of Classification Search ................... 710/52, 710/62, 6
See application file for complete search history.

(56) References Cited

U.S. PATENT DOCUMENTS

| | | | |
|---|---|---|---|
| 6,032,200 A * | 2/2000 | Lin | 710/6 |
| 6,463,483 B1 * | 10/2002 | Imperiali | 710/35 |
| 7,200,692 B2 * | 4/2007 | Singla et al. | 710/22 |
| 2004/0037319 A1 * | 2/2004 | Pandya | 370/469 |
| 2006/0010267 A1 * | 1/2006 | Abullarade et al. | 710/62 |

OTHER PUBLICATIONS

Definition of 'PCI Express', 2002, FARLEX.*

* cited by examiner

*Primary Examiner*—Henry W. H. Tsai
*Assistant Examiner*—Hyun Nam
(74) *Attorney, Agent, or Firm*—Blakely, Sokoloff, Taylor & Zafman LLP (57) ABSTRACT

A mechanism and technique to transfer data between a communication device and media hardware in a computing device. More particularly, an embodiment of the invention uses a quality of service to assure deterministic latencies in direct data transfers between a memory buffer and each of a communication device and an audio hardware controller.

30 Claims, 4 Drawing Sheets

LOW LATENCY MECHANISM FOR DATA TRANSFERS BETWEEN A MEDIA CONTROLLER AND A COMMUNICATION DEVICE

BACKGROUND OF THE INVENTION

1. Field of the Invention

The invention relates generally to transferring data between a communication device and a media controller in a computing device. More particularly, an embodiment of the invention allows data to be transferred between a communication device a media controller without relying on an intermediary software application.

2. Background Art

In present computer architecture, a media subsystem is typically under control of a device driver. A device driver is typically responsible for communicating with a media controller and controls the flow of data to and from the media controller. For playback of audio, for example, a software application may pass data to an audio device driver which then programs an audio controller with the relevant parameters to play back the audio stream via its corresponding audio hardware. The layers of computer architecture in the audio subsystem through which data may be directed are commonly referred to as a software stack. To reduce data transfer latencies, techniques exist for bypassing data transfer through at least part of the audio subsystem software stack. For example, in an audio capture application such as voice recording, the software application may provide an empty memory buffer to the audio device driver, which then programs the audio controller to capture data in the application-provided memory buffer. The audio controller signals the driver via an interrupt when capture is complete, and then the driver then hands-off the memory buffer back to the application.

If a separate device such as a communication device needs to utilize the capabilities of the media controller, it too needs to send data through its own software stack as well as the software stack associated with the media subsystem described above. For example, if a mobile communication device such as a PC-based cellular telephony device needs to utilize a headset attached to a PC audio controller, the software associated with the communication device needs to go through both its own driver software stack and the audio subsystem software stack. The multiple software stacks can add significant latencies to the flow of data, such that there can be a significant delay between the time media data is received by the stream from a communication device to the time it is played back to the user. Similarly, there can be a delay between the time a user speaks and the time the corresponding media data is actually handed-off to a communication device for transmission. These latencies can significantly deteriorate end-user experience when using a computing device's media controller for communications purposes.

BRIEF DESCRIPTION OF THE DRAWINGS

The various embodiments of the present invention are illustrated by way of example, and not by way of limitation, in the figures of the accompanying drawings and in which.

DETAILED DESCRIPTION

An embodiment of the invention provides a mechanism to reduce transmission latency for a data flow between a communication device and a media controller in a computing device. More particularly, an embodiment of the invention allows a communication device and a media controller to leverage various quality of service (QoS) capabilities as a way to avoid the need for an intermediary software application or operating system to direct a data flow from an application level of the computing system. The application level of the computing system is understood in the relevant art to refer to one or more interfaces which allow applications (including operating systems) to share and/or use data and resources. QoS can especially aid in assuring deterministic latencies—i.e. an expected amount of time used in performing operations such as data transfer operations. By interfacing devices so as to support QoS, an embodiment of the invention allows reliable data transfers between the devices, even under the limitations of a non real-time operating system. "Media" is understood to refer to data which represents some combination of audio and/or video information, such as that which heard (e.g. read) or recorded (e.g. written) by an end-user via hardware controlled by a media controller. While embodiments of the invention may be extended to apply to media data having any combination of audio and video information, descriptions herein will be limited to the example of techniques and mechanisms for transferring audio data. Furthermore, references to a controller—e.g. "media controller" or "audio controller"—as used herein, is understood to mean either a dedicated device to control hardware capable of playing and/or recording media data, or the hardware itself, where control of said hardware is otherwise integrated into said hardware.

Figure 1:
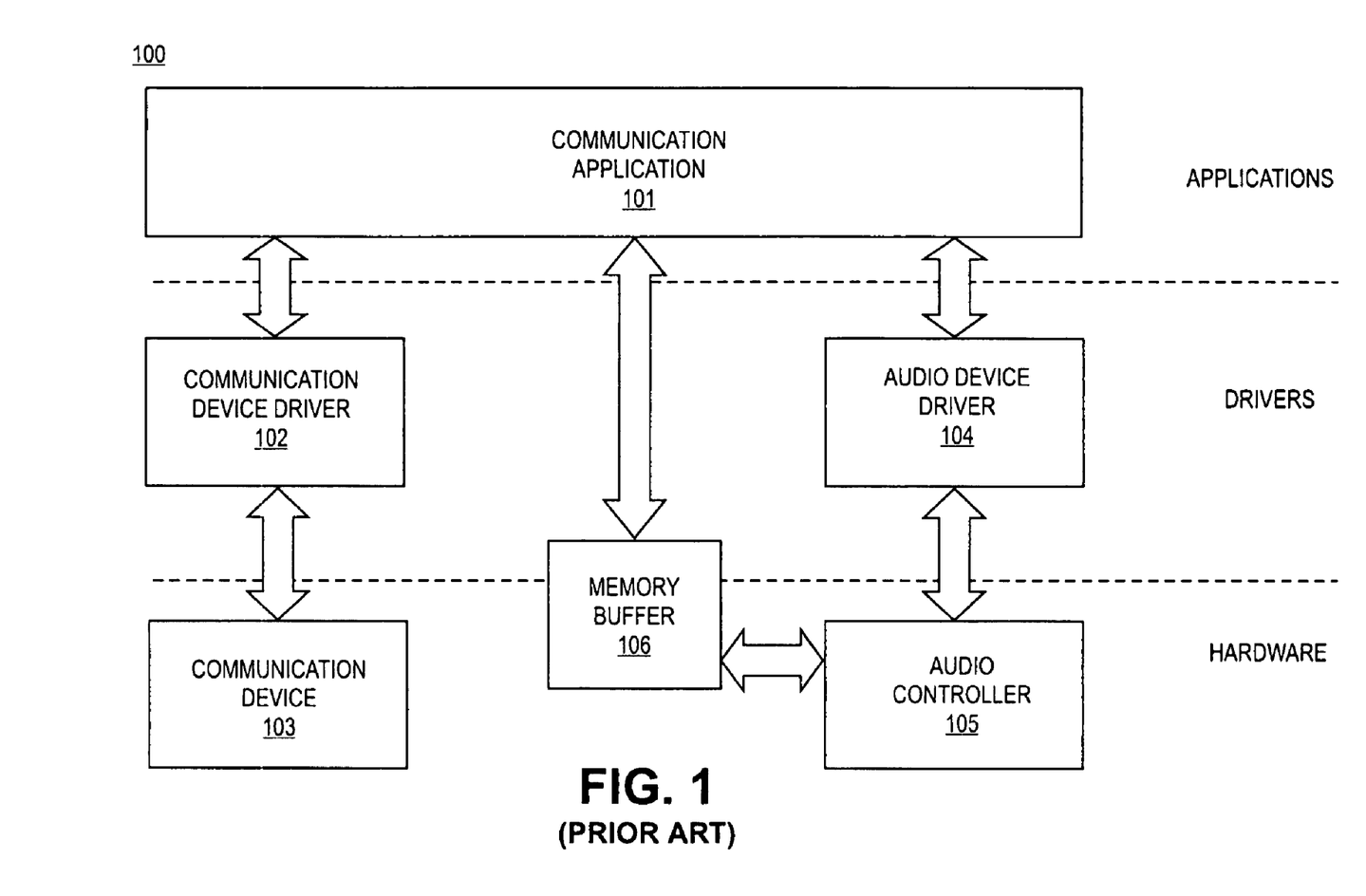
FIG. 1 is a block diagram illustrating a prior art architecture to transfer data between a communication device and an audio controller.

FIG. 1 illustrates a prior art architecture 100 whereby a communication device 103 exchanges data with an audio controller 105. Architecture 100 may represent a personal computer (PC) architecture wherein an exchange of data between communication device 103 and audio controller 105 is directed by communication application 101—e.g. in response to user input. Architecture 100 may be divided into a hardware level wherein hardware devices operate, an application level wherein applications and/or operating systems use and/or share resources, and a driver level, whereby data and configuration information may be relayed between applications and hardware devices. As used herein, "communication application" refers to any program executing on an application level of a computing device which may direct the transfer of data to and/or from a communication device based at least in part on a runtime operation of said communication application. Such a program is understood to include, potentially, an operating system. Typically, the communication application 101 is a real-time application, meaning the application is designed to prioritize the performance of one or more operations in time for a critical deadline. At least part of an audio subsystem of architecture 100 is represented by audio device driver 104 and an audio controller 105. When a user command, software instruction or other source causes the communication application 101 to direct a data transfer between communication device 103 and audio controller 105, the resulting data flow takes place within the constraints of architecture 100.

In a simple case, communication data to be played by the audio hardware, for example, may be sequentially directed from communication device 103 to communication device driver 102, then to communication application 101, then to audio device driver 104, and then to audio controller 105. Similarly, data to be sent from the audio controller 105 to the communication device 103—e.g. data for transmission by the communication device 103—may, in the simple case, be directed through the reverse of the above-described sequence. This directing of data through both the audio subsystem stack and the communication stack may result in significant latencies to the flow of data, such that there can be a significant delay between the time communication device 103 provides audio data to be played and the time it is played back to the user by audio controller 105. Similarly, there may be a resulting delay between the time the user speaks or otherwise uses the audio controller 105 to the time the generated data is actually handed-off to communication device 103 for transmission.

To overcome these latencies, architecture 100 was developed to use a memory buffer 106 for data captured via audio controller 105. Typically, memory buffer 106 is a circular or "ring" buffer. In this case, the directing of data to the audio controller 105 remains the same as described above. In other words, data from communication device 103 would be directed to the communication device driver 102, and then to communication application 101, which then passes the data to the audio device driver 104, which in turn programs the audio controller 105 with the relevant parameters to play back the audio stream. However, for an audio data capture—e.g. voice recording—the communication application 101 provides an empty memory buffer 106 to the audio device driver 104. The audio device driver 104 may then program the audio controller 105 to capture data in the memory buffer 106 provided by communication application 101. The audio controller 105 may send an interrupt to the audio device driver 104 when data capture is complete. Upon receiving the interrupt, the audio device driver 104 may then hand-off the memory buffer 106 back to the communication application 101.

Architecture 100 partially reduces data communication latency by leveraging rate-matching between audio controller 105 and communication application 101. For example, architecture 100 may use an interface supporting the Peripheral Component Interconnect Express (PCI Express®) Base Standard 1.0—Peripheral Component Interconnect Special Interest Group (PCI-SIG®), July, 2002—as a connection standard between the communication application 101 and the memory buffer 106. In using PCI Express®, which supports isochronous data transfers, architecture 100 can exploit deterministic latencies for data read/write operations involving memory buffer 106. As a result, the read or write operations to memory buffer 106 performed by the audio controller 105 may be rate-matched with the communication application 101 producing or consuming, respectively, the data in memory buffer 106.

The audio device driver 104 can initialize a read (or write) memory buffer 106 between the communication application 101 and the audio controller 105. In the case of the audio controller 105 receiving communication data, the communication application 101 can signal the audio device driver 104 to signal the audio controller 105 to start processing data in the memory buffer 106. Once the audio controller 105 begins reading from memory buffer 106, no further device interrupts or device programming from audio device driver 104 are necessary as the audio controller 105 directly processes the memory buffer 106 continuously at a constant data rate.

Figure 2:
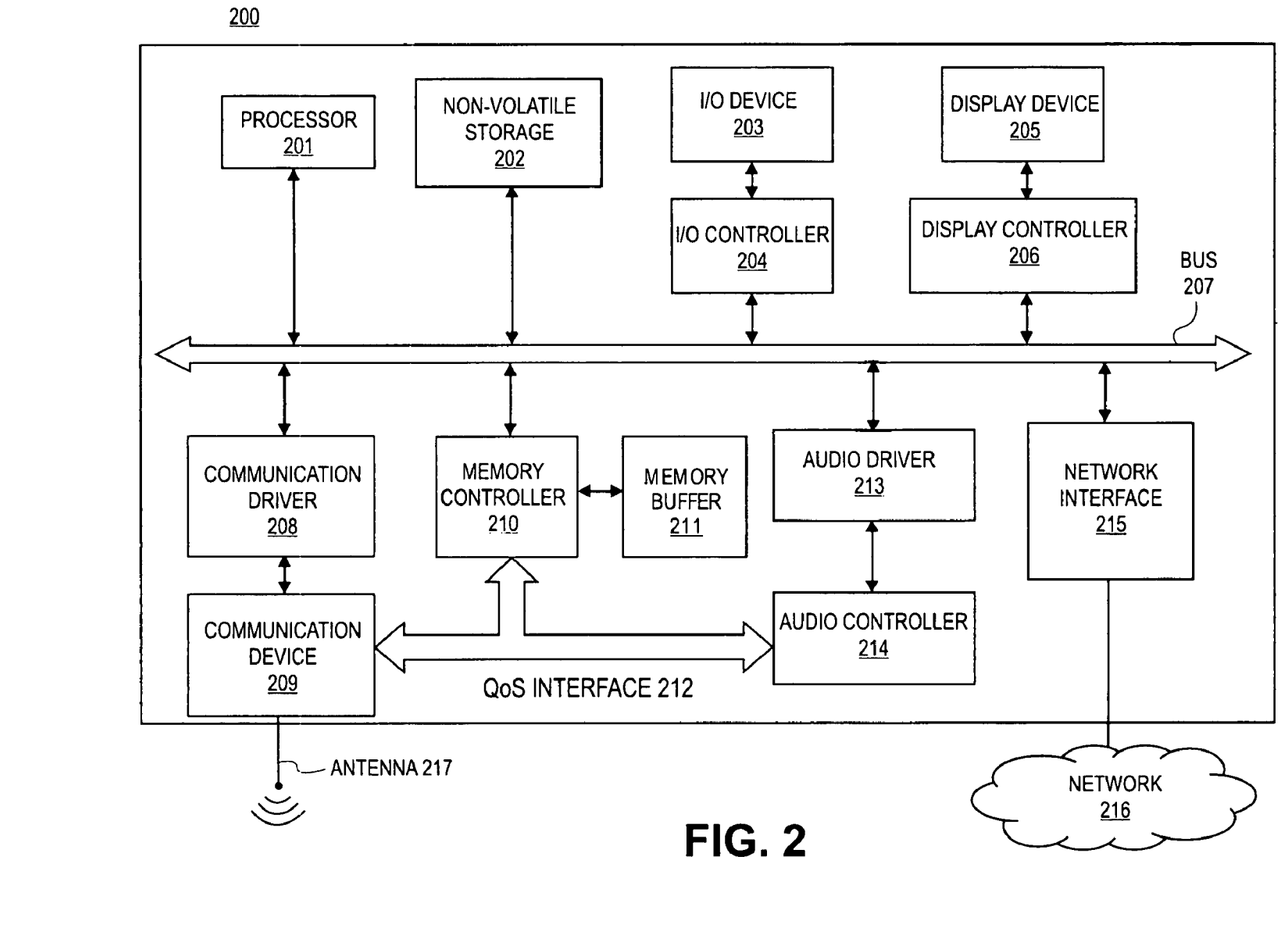
FIG. 2 is a block diagram illustrating a system to implement low latency data transfers according to an embodiment of the invention.

FIG. 2 illustrates one embodiment of a computer system suitable to implement an embodiment of the invention. Computer system 200 may include bus 207 or other communication device for communicating information, and processor 201 coupled to bus 207 for processing information. While computer system 200 is illustrated with a single processor, computer system 200 can include multiple processing units in varying configurations. Computer system 200 may also have, coupled to bus 207, a non-volatile storage device 202—e.g. read-only memory (ROM) or firmware—to store BIOS instructions or similar system software for processor 201. Computer system 200 can also have a display device 205 such as a cathode ray tube (CRT) or liquid crystal display (LCD) coupled to bus 207 via a display controller 206, for displaying information to a computer user. Alphanumeric input/output (I/O) device 203, including alphanumeric and other keys, may also be coupled to bus 207 via an I/O controller 204. Computer system 200 may further include a network interface 215 that provides access to a network 216. In one embodiment, network interface 215 is a network interface card (NIC); however, other network interfaces can also be used. Computer system 200 may have additional memory (not shown) for storing information and instructions to be executed by processor 201. This additional memory may include, for example, random access memory (RAM) coupled to bus 207 and storing the executable code of a communication application and/or storing temporary variables or other intermediate information during execution of instructions by processor 201.

Computer system 200 may include communication device 209 to transfer communication data to and/or from audio controller 214 according to an embodiment of the invention. Communication device 209 may be connected to bus 207 via communication driver 208 and may have, for example, an antenna 217 to send and receive communication data. Although computer system 200 shows an integrated communication device 209 to transmit and/or receive communication data via antenna 217, alternate embodiments of the invention may, for example, have a external communication device to provide communication data to computer system 200, for example via a connector used in connecting to quality of service (QoS) interface 212. This connector may use any of a variety of parallel port connectors such as those which accept a connection complying with the Institute of Electrical and Electronics Engineers (IEEE) Standard 1284-1994, "IEEE Standard Signaling Method for a Bidirectional Parallel Peripheral Interface for Personal Computers", released March, 1994. Alternately, this connector may be able to accept any of a variety of serial bus connections, such as a PCI Express® connection, a Serial Advanced Technology Attachment (SATA) connection, or a Universal Serial Bus (USB) connection. Furthermore, audio controller 214 may be connected to bus 207 via audio driver 213 to send and/or receive audio data. Audio controller 214 may be implemented by any of a variety of combinations of hardware and software control mechanisms. The communication device 209 and audio controller 214 may each be connected to memory controller 210 via a QoS interface 212, i.e. an interface which includes or otherwise supports some mechanism to provide a QoS to one or more devices connected thereto. QoS, which is well known in the art, is understood to refer to any set of control mechanisms in data communication which can prioritize different users and/or different data flows, or otherwise guarantee some known performance level in data communication. In an embodiment of the invention, each of communication device 209 and audio controller 214 are capable of implementing or otherwise supporting the QoS available via QoS interface 212. Additionally, processor 201 may be directly or indirectly coupled to QoS interface 212 to drive or otherwise coordinate the data transfers on QoS interface 212 with other operations executing on computer system 200.

Memory buffer 211 is coupled to and controlled by memory controller 210. In one embodiment, memory buffer 211 is a ring buffer. Although only one buffer is shown, memory buffer 211 is understood to potentially represent both a record (write) memory buffer—e.g. one which is written to by audio controller 214 and read from by communication device 209—and a playback (read) memory buffer—e.g. one which is written to by communication device 209 and read from by audio controller 214. Where descriptions of embodiments of the invention herein refer to a single (e.g. read) memory buffer for a given direction of data flow, it is understood that these embodiments may be extended to further include a corresponding (e.g. write) memory buffer for data flow in the opposite direction. Dedicated bus lines, shared bus lines or other types of connections may be used support these opposing directions of data flow, each for a corresponding memory buffer. The invention is not limited in this regard. Furthermore, in various embodiments of the invention, audio controller 214 and communication device 209 need not share a common QoS interface connection either to memory controller 210 or to one another. In other words, each of audio controller 214 and communication device 209 may have their own dedicated QoS interface with memory controller 210.

An embodiment of the invention provides a mechanism to further reduce data flow latencies which are found in architecture 100 of FIG. 1. These latencies may result where communication application 101 is a real-time application executing in a non real-time operating system (OS). For example, any ability of communication application 101 to support deterministic access to memory buffer 106 is constrained by the execution of communication application 101 under a non real-time OS. When the OS is under a heavy processing load, for example, latency penalties are created by virtue of the non real-time OS performance limitations, which may result in an under-run or an over-run of the memory buffer 106. To further isolate computer system 200 or similar systems from potential data transfer latencies, an embodiment of the invention eliminates the need for an intermediary software application or operating system to direct a data flow from an application level of computer system 200.

Figure 3:
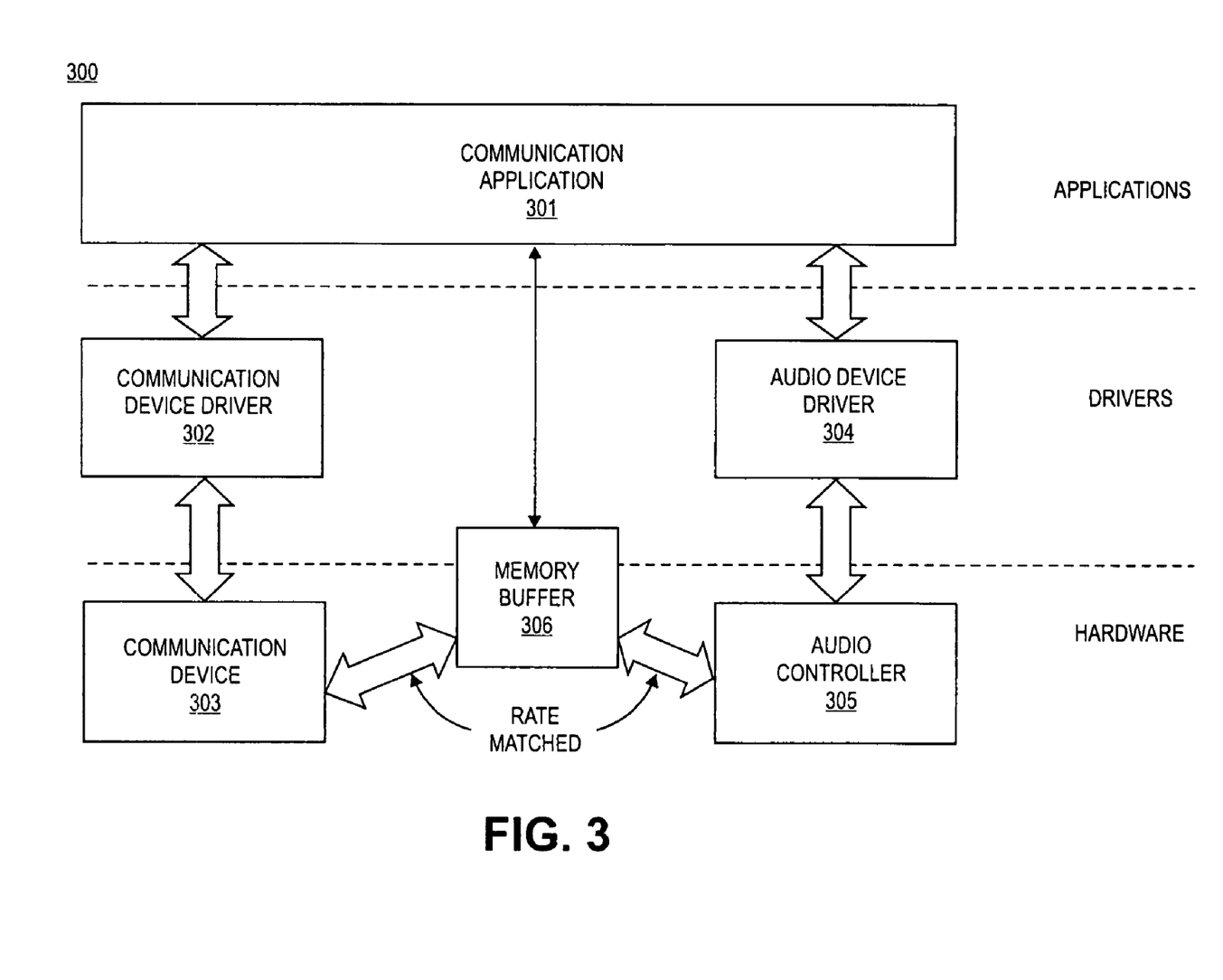
FIG. 3 is a block diagram illustrating a low latency transfer of data according to an embodiment of the invention.

FIG. 3 illustrates how one embodiment of the invention, using an architecture 300 further reduces data flow latencies otherwise found, for example, in architecture 100. Like architecture 100, architecture 300 may be divided into a hardware level, a driver level, and an application level. In this embodiment, a more complete solution to avoiding latencies is possible if the shared memory buffer approach is used for direct communication with a memory buffer 306 both by a communication device 303 and by an audio controller 305. In this case, memory buffer 306 may be a circular or "ring" buffer. The memory buffer 306 may be allocated by the audio device driver 304 as described in reference to FIG. 1. For example, audio device driver 304 may initialize memory from an OS non-paged memory pool to act as a circular buffer to be written to and read from by communication device 303 and audio controller 305, respectively.

Architecture 300 includes a communication device 303 to transfer audio data with audio controller 305. Communication device may be any of a variety of devices to receive and/or transmit media information including, but not limited to: a voice-over-internet-protocol (VOIP) device, a wireless (e.g. Bluetooth) device, a cellular device, a dedicated MP3 player, a digital and/or satellite radio device, etc. For video, a communication device may be a TV tuner or similar device to receive media data, provided that the media data to be read (e.g. played) via a media controller was already formatted for use by the media controller—i.e. the computing device does not have to perform a video decode or other data processing to prepare the media data for use by the receiving media controller. Communication device 303 and audio controller 305 are coupled to communication application 301 via communication device driver 302 and audio device driver 304, respectively. Architecture 300 may represent a computer architecture wherein an exchange of data between communication device 303 and audio controller 305 is directed by communication application 301—e.g. in response to user input.

As with architecture 100, the transfer of data in architecture 300 may experience latencies, should a flow of data be directed from communication device 303 to communication device driver 302, then to communication application 301, then to audio device driver 304, and then to audio controller 305. To reduce the latency caused by data being directed through one or more software stacks, and to limit the effects of latencies resulting from the communication application 301 running under a non real-time operating system, a data memory buffer 306 may be configured to transfer data with both audio controller 305 and communication device 303.

An embodiment of the invention provides memory buffer 306 with an ability to interface both with communication device 303 and with audio controller 305 using mechanisms which support a QoS. For the illustrative case in FIG. 3, the interface between memory buffer 306 and each of communication device 303 and audio controller 305 supports a rate-matching QoS. Rate-matching assures that the rate of reading data from memory buffer 306 by one of communication device 303 and audio controller 305 matches, or is otherwise appropriate for, the rate of writing data to memory buffer 306 by the other of communication device 303 and audio controller 305.

In one embodiment of the invention, rate-matching may be provided, for example, by having each of memory buffer 306, communication device 303 and audio controller 305 implement or otherwise enable communication via a PCI Express® standard, e.g. PCI Express Base Standard 1.0. PCI Express supports rate matching by providing for isochronous data transfers. By leveraging isochronous data transfers, for example, memory buffer 306 can, at matched rates, be directly read from and written to by communication device 303 and audio controller 305, respectively. These rate-matched read and write operations prevent either an over-run or an under-run of memory buffer 306. Conversely, memory buffer 306 can be configured to be directly written to and read from by communication device 303 and audio controller 305, respectively, in the same manner by leveraging isochronous data transfers.

Direct data reads from and writes to memory buffer 306 using a QoS—such as that provided by a PCI Express interface—allows communication device 303 and audio controller 305 to transfer data at known rates, without the need for communication application 301 to direct a data flow from an application level of architecture 300. Since no software intervention is necessary after memory buffer 306 is initialized for data transfers with communication device 303 and audio controller 305, it is possible to build a system where deterministic latency paths allow these transfers to be handed off from the communication application 301, thus isolating the data transfers from the potential latencies caused by a real-time OS such as those typically present on PCs.

Figure 4:
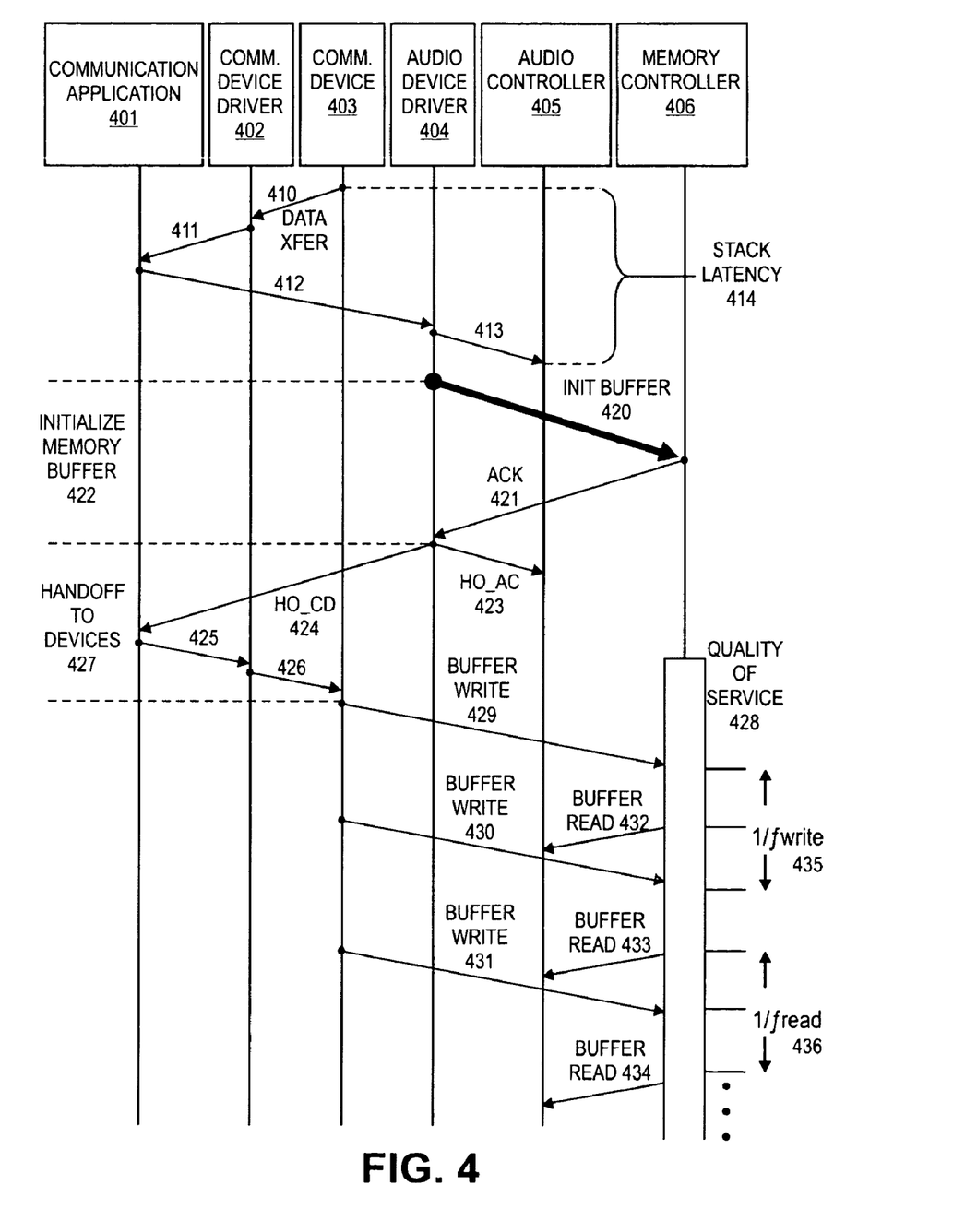
FIG. 4 is a flow diagram illustrating a method for reducing data transfer latency according to an embodiment of the invention.

FIG. 4 illustrates a sequence of transactions 400 taken to implement data transfers according to one embodiment of the invention. The sequence of transactions 400 includes interactions between a communication device driver 402 and a corresponding communication device 403, an audio device driver 404 and a corresponding audio controller 405, a communication application 401 to support data transfers between communication device 403 and audio controller 405, and a memory controller 406 to store data to be transferred. The memory controller 406 in this case acts as a control mechanism whereby one or both of communication device driver 402 and audio controller 405 write to and/or read from one or more memory buffers (not shown) such as one of the type represented by memory buffer 306. In this example, data transfers between memory controller 406 and each of communication device driver 402 and audio controller 405 may be supported by a QoS—such as that provided via QoS interface 212.

As an illustration of the latencies 414 which result from directing data through multiple software stacks, sequence 400 includes data transfers 410-413. In this example, communication device 403 has audio data to write to audio controller 413—e.g. VOIP data to be played in a headphone speaker. Data is sequentially sent from communication device 403 to communication device driver 402, at 410, then to communication application 401, at 411, and then to audio device driver 404, at 412, and finally to the audio controller 405, at 413. This method of transferring data results in stack latency 414, which deteriorates end-user experience.

To avoid stack latency 414, an embodiment of the invention creates, allocates or otherwise initializes a memory buffer in a memory location controlled by memory controller 406. Memory controller 406 may then selectively configure each of one or more ring buffers, for example, either to support reads from audio controller 405 and writes to communication device 403, or to support writes to audio controller 405 and reads from communication device 403. In the example of FIG. 4, the audio device controller 404 may initiate a memory buffer initialization stage 422 by sending a buffer initialization signal 420 to memory controller 406. After memory controller 406 has setup a memory buffer to support data transfers, an acknowledgement signal 421 may be sent from memory controller 406 to audio device driver 404. Whereas the acknowledgement signal 421 in this example represents an initialization of a memory buffer to be written to by communication device 403 and read from by audio controller 405, additional memory buffers may also be initialized. For example, a second (and third, etc.) memory buffer may be also initialized to handle a series of transactions (not shown) in which the second memory buffer is to be read from by communication device 403 and written to by audio controller 405.

In response to acknowledgement signal 421, audio device driver 404 may initiate a device handoff stage 427 by sending a handoff signal HO_AC 423 to notify audio controller 405 that data transfers with communication device 403 will be via memory controller 406 rather than via audio device driver 404. Similarly, audio device driver 404 may send a handoff signal HO_CD 424 to communication application 401, which results in communication device driver 402 receiving a corresponding signal 425, which in turn results in communication device 403 receiving a corresponding signal 426. Each of signals 424-426 respectively notifies communication application 401, communication device driver 402 and communication device 403 that data transfers between communication device 403 and audio controller 405 will be conducted directly via memory controller 406.

Once notified, communication device 403 may perform memory buffer writes 429-431, for example, directly to memory controller 406. Similarly, audio controller may perform memory buffer reads 432-434, for example, directly from memory controller 406. A set of data which is written a memory buffer via memory controller 406 during one of buffer writes 429-431 may eventually be read from said memory buffer, for example, by one of buffer reads 432-434. These memory buffer writes 429-431 and memory buffer reads 432-434 are supported by QoS 428, which in this case provides a rate-matching of memory buffer reads and writes. Rate matching in this example is represented by a time period $1/f_{write}$ 435 being equal to $1/f_{read}$ 436 where $f_{write}$ 435 is a frequency of buffer write operations 429-431 performed by communication device 403, and where $f_{read}$ 436 is a frequency of buffer read operations 432-434 performed by audio controller 405.

QoS 428 guarantees that direct memory buffer reads 432-434 and direct memory buffer writes 429-431 can take place without needing communication application 401 to direct data flow. For a processor running the executable code for communication application 401, this results in a reduction in processing load, since the communication application 401 has one less task to perform. As a result, the system or device in which communication application 401 is executing may be placed into a low power state.

Techniques and architectures for transferring data are described herein. In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions which follow are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of procedures leading to a desired result. The procedures are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. The required structure for a variety of these systems will appear from the description below. In addition, the present invention is not described with reference to any particular programming language. It will be appreciated that a variety of programming languages may be used to implement the teachings of the invention as described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
   performing a first transfer sequence for media data of a data stream, the first transfer sequence including exchanging media data with a communication device driver of a computing device and a media device driver of the computing device;
   identifying that a memory buffer of the computing device is initialized for a second transfer sequence for media data of the data stream;
   in response to the identifying, transmitting a handoff message to hand off the data stream from the first transfer sequence to the second transfer sequence, the handing off to bypass the communication device driver and the media device driver; and
   in response to the handoff message, performing the second transfer sequence, including:
      performing an exchange of a first set of media data between a communication device and the memory buffer, wherein the communication device performs one of a direct reading from the memory buffer and a direct writing to the memory buffer;
      performing an exchange of a second set of media data between the memory buffer and a media controller of the computing device, wherein the media controller performs another of the direct reading from the memory buffer and the direct writing to the memory buffer; and
      regulating both the direct reading from the memory buffer and the direct writing to the memory buffer according to a quality of service.

2. The method of claim 1, wherein the set of media data which is read from the memory buffer by one of the communication device and the media controller was previously written to the memory buffer by another of the communication device and the media controller.

3. The method of claim 1, wherein neither the exchanging the first set of media data nor the exchanging the second set of media data is directed by any software program or operating system executing on an application level of the computing device.

4. The method of claim 1, the handing off the data stream including a software program executing on an application level of the computing device handing off to one of the communication device and the media controller one of reading from the memory buffer and writing to the memory buffer.

5. The method of claim 1, wherein the quality of service includes support for an isochronous data transfer.

6. The method of claim 5, wherein the regulating both the direct reading from the memory buffer and the direct writing to the memory buffer includes matching a rate of the direct reading from the memory buffer to a rate of the direct writing to the memory buffer, the matching via an isochronous data transfer.

7. The method of claim 5, wherein the quality of service is provided using a Peripheral Component Interconnect Express communication standard for the direct reading from the memory buffer and the direct writing to the memory buffer.

8. The method of claim 1 further comprising:
   exchanging a third set of media data between the communication device and a second memory buffer of the computing device, wherein the communication device performs one of a direct reading from the second memory buffer and a direct writing to the second memory buffer;
   exchanging a fourth set of media data between the memory buffer and the media controller of the computing device, wherein the media controller performs another of the direct reading from the second memory buffer and the direct writing to the second memory buffer;
   regulating both the direct reading from the second memory buffer and the direct writing to the second memory buffer according to a quality of service.

9. An apparatus comprising:
   a communication device driver and a media device driver to exchange media data of a data stream for a first transfer sequence;
   a memory buffer and a media controller to exchange media data of the data stream for a second transfer sequence, including:
      the memory buffer to exchange a first set of media data with a communication device, wherein the communication device performs one of direct reading from the memory buffer and direct writing to the memory buffer; and
      the media controller to exchange a second set of media data with the memory buffer, wherein the media controller performs another of direct reading from the memory buffer and direct writing to the memory buffer; and
   a memory controller to regulate both the direct reading from the memory buffer and the direct writing to the memory buffer, the regulating according to a quality of service,
   wherein a hand off of the data stream from the first transfer sequence to the second transfer sequence is performed in response to identifying that the memory buffer is initialized for the second transfer sequence, the handing off of the data stream to bypass the communication device driver and the media device driver.

10. The apparatus of claim 9, further comprising:
a data processing unit to execute one or more software programs on an application level,
wherein the memory buffer is to be allocated in response to one of the one or more software programs, and
wherein both the direct reading from the memory buffer and the direct writing to the memory buffer are to be performed without direction by any of the one or more software programs.

11. The apparatus of claim 9, wherein the direct reading from the memory buffer by one of the communication device and the media controller is to exchange data previously written to the memory buffer by the other of the communication device and the media controller.

12. The apparatus of claim 9, wherein it is media controller is an audio controller.

13. The apparatus of claim 9, wherein the quality of service includes support for an isochronous data transfer, and wherein regulating both the direct reading from the memory buffer and the direct writing to the memory buffer includes matching a rate of the direct reading from the memory buffer to a rate of the direct writing to the memory buffer, the matching via an isochronous data transfer.

14. The apparatus of claim 13, wherein the quality of service is provided using a Peripheral Component Interconnect Express communication standard for the direct reading from the memory buffer and the direct writing to the memory buffer.

15. The apparatus of claim 9, further comprising
a second memory buffer to exchange a third set of media data with the communication device, wherein the communication device performs one of direct reading from the second memory buffer and direct writing to the second memory buffer,
the media controller further to exchange a fourth set of media data with the second memory buffer, wherein the media controller performs another of direct reading from the second memory buffer and direct writing to the second memory buffer, and
wherein the memory controller is further to regulate both the direct reading from the second memory buffer and the direct writing to the second memory buffer according to a quality of service.

16. A system comprising:
a communication device driver and a media device driver to exchange media data of a data stream for a first transfer sequence;
a memory buffer and a media controller to exchange media data of the data stream for a second transfer sequence, including:
the memory buffer to exchange a first set of media data with a communication device, wherein the communication device performs one of direct reading from the memory buffer and direct writing to the memory buffer; and
the media controller to exchange a second set of media data with the memory buffer, wherein the media controller performs another of direct reading from the memory buffer and direct writing to the memory buffer;
a memory controller to regulate both the direct reading from the memory buffer and the direct writing to the memory buffer, the regulating according to a quality of service; and
a serial interface bus connector coupled to the memory buffer, the serial interface bus connector to enable the memory buffer to exchange the first set of media data with the communication device,
wherein a hand off of the data stream from the first transfer sequence to the second transfer sequence is performed in response to identifying that the memory buffer is initialized for the second transfer sequence, the handing off of the data stream to bypass the communication device driver and the media device driver.

17. The system of claim 16, further comprising:
a data processing unit to execute one or more software programs on an application level,
wherein the memory buffer is to be allocated in response to one of the one or more software programs, and
wherein both the direct reading from the memory buffer and the direct writing to the memory buffer are to be performed without direction by any of the one or more software programs.

18. The system of claim 16, wherein the direct reading from the memory buffer by one of the communication device and the media controller is to exchange data previously written to the memory buffer by the other of the communication device and the media controller.

19. The system of claim 16, wherein it is media controller is an audio controller.

20. The system of claim 16, wherein the quality of service includes support for isochronous data transfers, and wherein regulating both the direct reading from the memory buffer and the direct writing to the memory buffer includes matching a rate of the direct reading from the memory buffer to a rate of the direct writing to the memory buffer, the matching via an isochronous data transfer.

21. The system of claim 20, wherein the quality of service is provided using a Peripheral Component Interconnect Express communication standard for the direct reading from the memory buffer and the direct writing to the memory buffer.

22. The system of claim 16, further comprising
a second memory buffer to exchange a third set of media data with the communication device, wherein the communication device performs one of direct reading from the second memory buffer and direct writing to the second memory buffer,
the media controller further to exchange a fourth set of media data with the second memory buffer, wherein the media controller performs another of direct reading from the second memory buffer and direct writing to the second memory buffer, and
wherein the memory controller is further to regulate both the direct reading from the second memory buffer and the direct writing to the second memory buffer according to a quality of service.

23. A machine-readable medium that provides instructions, which when executed by a set of one or more processors, cause said set of processors to perform a method comprising:
performing a first transfer sequence for media data of a data stream, the first transfer sequence including exchanging media data with a communication device driver of a computing device and a media device driver of the computing device;
identifying that a memory buffer of the computing device is initialized for a second transfer sequence for media data of the data stream;
in response to the identifying, transmitting a handoff message to hand off the data stream from the first transfer sequence to the second transfer sequence, the handing off to bypass the communication device driver and the media device driver; and in response to the handoff message, performing the second transfer sequence, including:
- performing an exchange of a first set of media data between a communication device and the memory buffer, wherein the communication device performs one of a direct reading from the memory buffer and a direct writing to the memory buffer;
- performing an exchange of a second set of media data between the memory buffer and a media controller of the computing device, wherein the media controller performs another of the direct reading from the memory buffer and the direct writing to the memory buffer; and
- regulating both the direct reading from the memory buffer and the direct writing to the memory buffer according to a quality of service.

24. The machine-readable medium of claim 23, wherein the set of media data which is read from the memory buffer by one of the communication device and the media controller was previously written to the memory buffer by another of the communication device and the media controller.

25. The machine-readable medium of claim 23, wherein neither the exchanging the first set of media data nor the exchanging the second set of media data is directed by any software program or operating system executing on an application level of the computing device.

26. The machine-readable medium of claim 23, wherein it is media controller is an audio controller.

27. The machine-readable medium of claim 23, wherein the quality of service includes support for an isochronous data transfer.

28. The machine-readable medium of claim 27, wherein the regulating both the direct reading from the memory buffer and the direct writing to the memory buffer includes matching a rate of the direct reading from the memory buffer to a rate of the direct writing to the memory buffer, the matching via an isochronous data transfer.

29. The machine-readable medium of claim 27, wherein the quality of service is provided using a Peripheral Component Interconnect Express communication standard for the direct reading from the memory buffer and the direct writing to the memory buffer.

30. The machine-readable medium of claim 23, the method further comprising:
- exchanging a third set of media data between the communication device and a second memory buffer of the computing device, wherein the communication device performs one of a direct reading from the second memory buffer and a direct writing to the second memory buffer;
- exchanging a fourth set of media data between the memory buffer and the media controller of the computing device, wherein the media controller performs another of the direct reading from the second memory buffer and the direct writing to the second memory buffer;
- regulating both the direct reading from the second memory buffer and the direct writing to the second memory buffer according to a quality of service.

* * * * *